(12) United States Patent
Kouskoulas et al.

(10) Patent No.: US 12,223,061 B1
(45) Date of Patent: Feb. 11, 2025

(54) METHODS AND SYSTEMS FOR ANALYZING DATAFLOW ASSOCIATED WITH SOFTWARE CODE TO DETECT SOFTWARE ANOMALIES

(71) Applicant: Affirm Logic Corporation, McLean, VA (US)

(72) Inventors: Yanni Kouskoulas, Seattle, WA (US); Ada Lindberg, Knoxville, TN (US); Arion Lawrence, Vienna, VA (US); Chris O'Ferrell, Burleson, TX (US)

(73) Assignee: Affirm Logic Corporation, McLean, VA (US)

( * ) Notice: Subject to any disclaimer, the term of this patent is extended or adjusted under 35 U.S.C. 154(b) by 0 days.

(21) Appl. No.: 18/590,781

(22) Filed: Feb. 28, 2024

(51) Int. Cl.
  *G06F 21/57*  (2013.01)
  *G06F 9/445*  (2018.01)
  *G06F 21/56*  (2013.01)

(52) U.S. Cl.
  CPC ........ *G06F 21/577* (2013.01); *G06F 9/44589* (2013.01); *G06F 21/563* (2013.01); *G06F 2221/033* (2013.01)

(58) Field of Classification Search
  CPC .. G06F 21/577; G06F 9/44589; G06F 21/563; G06F 2221/033
  USPC ................................................ 717/120–178
  See application file for complete search history.

(56) References Cited

U.S. PATENT DOCUMENTS

| | | | |
|---|---|---|---|
| 9,038,033 B1 | 5/2015 | Hidayat | |
| 9,507,945 B2 | 11/2016 | Kouskoulas et al. | |
| 9,824,216 B1 * | 11/2017 | Khalid | G06F 21/554 |
| 10,445,502 B1 * | 10/2019 | Desphande | G06F 21/554 |
| 10,803,051 B2 * | 10/2020 | Deb | G06F 16/9024 |
| 11,645,388 B1 * | 5/2023 | Kimball | G06N 20/20 726/23 |
| 11,979,428 B1 * | 5/2024 | Ismael | G06F 21/53 |

(Continued)

OTHER PUBLICATIONS

Kronjee, Jorrit, Arjen Hommersom, and Harald Vranken. "Discovering software vulnerabilities using data-flow analysis and machine learning." Proceedings of the 13th international conference on availability, reliability and security. 2018.pp. 1-10 (Year: 2018).*

(Continued)

*Primary Examiner* — Satish Rampuria
(74) *Attorney, Agent, or Firm* — Cooley LLP

(57) ABSTRACT

A non-transitory processor-readable medium stores code representing instructions to be executed by one or more processors, and the instructions include code to cause the one or more processors to (1) receive executable binary code and a specification that defines a constraint and (2) generate a predicate set. The code also causes the one or more processors to identify an argument of a function to be called by the executable binary code, the argument identified based on a map. A constrained predicate set is generated based on the predicate set and the machine-readable specification and, using solver software, the code causes the one or more processors to determine that the argument satisfies the constraint based on the constrained predicate set. A signal that indicates that the executable binary code is associated with a predetermined software action is generated in response to determining the argument satisfies the constraint.

22 Claims, 6 Drawing Sheets

(56) References Cited

U.S. PATENT DOCUMENTS

| | | | |
|---|---|---|---|
| 2010/0293407 A1* | 11/2010 | Locasto | G06F 11/3672 |
| | | | 714/2 |
| 2014/0026127 A1 | 1/2014 | McEwan | |
| 2016/0371494 A1 | 12/2016 | Daymont | |
| 2017/0199730 A1 | 7/2017 | Hay et al. | |
| 2018/0316715 A1 | 11/2018 | Liu et al. | |
| 2019/0207969 A1* | 7/2019 | Brown | G06F 21/552 |
| 2021/0099483 A1 | 4/2021 | Shukla | |

OTHER PUBLICATIONS

Lin, Guanjun, et al. "Software vulnerability detection using deep neural networks: a survey." Proceedings of the IEEE 108.10 (2020): pp. 1825-1848. (Year: 2020).*

Cheng, Long, et al. "Checking is believing: Event-aware program anomaly detection in cyber-physical systems." IEEE Transactions on Dependable and Secure Computing 18.2 (2019): pp. 825-842. (Year: 2019).*

Gupta, and Soffa. "A framework for partial data flow analysis." Proceedings 1994 International Conference on Software Maintenance. IEEE, 1994. pp. 4-13. (Year: 1994).*

Dwyer, Matthew B., and Lori A. Clarke. "Data flow analysis for verifying properties of concurrent programs." ACM SIGSOFT Software Engineering Notes 19.5 (1994): pp. 62-75. (Year: 1994).*

Olender, Kurt M., and Leon J. Osterweil. "Cecil: A sequencing constraint language for automatic static analysis generation." IEEE Transactions on Software Engineering 16.3 (1990): pp. 268-280. (Year: 1990).*

Non-Final Office Action for U.S. Appl. No. 18/498,999 dated Jan. 23, 2024, 16 pages.

[Author Unknown] "Open Source Ghidra, The First Few Months", Recon MTL 2019, 51 pages.

[Author Unknown] "Writing Yara Rules—yara 4.4.0. documentation", 2014, 36 pages. Retrieved online: https://yara.readthedocs.io/en/stable/writingsrules.html.

Ballenthin et al., "capa: Automatically Identify Malware Capabilities", Threat Research, Jul. 16, 2020 (last updated Nov. 29, 2023), 13 pages.

National Cybersecurity and Communications Integration Center (NCCIC), "Using Yara for Malware Detection", May/Jun. 2015, 1 page.

Notice of Allowance for U.S. Appl. No. 18/498,999 dated May 13, 2024, 5 pages.

Notice of Allowance for U.S. Appl. No. 18/498,999 mailed Aug. 28, 2024, 5 pages.

Notice of Allowance for U.S. Appl. No. 18/621,875 mailed Jul. 3, 2024, 12 pages.

* cited by examiner

500

```
┌─────────────────────────────────────────────────────────────┐
│ Receive (1) a file that includes executable binary code and (2) a │
│ specification that defines a constraint, and generate a predicate set │
│           based on the executable binary code                │
│                          502                                 │
└─────────────────────────────────────────────────────────────┘
                              │
                              ▼
┌─────────────────────────────────────────────────────────────┐
│ Identify an argument of a function to be called by the executable │
│ binary code, the argument identified based on a map associated │
│                    with the function                         │
│                          504                                 │
└─────────────────────────────────────────────────────────────┘
                              │
                              ▼
┌─────────────────────────────────────────────────────────────┐
│ Generate a constrained predicate set based on the predicate set │
│        and the machine-readable specification                │
│                          506                                 │
└─────────────────────────────────────────────────────────────┘
                              │
                              ▼
┌─────────────────────────────────────────────────────────────┐
│ Determine, using solver software, that the argument satisfies the │
│      constraint based on the constrained predicate set       │
│                          508                                 │
└─────────────────────────────────────────────────────────────┘

┌─────────────────────────────────────────────────────────────┐
│ Generate a signal that indicates that the executable binary code is │
│ associated with a predetermined software action in response to │
│       determining the argument satisfies the constraint      │
│                          510                                 │
└─────────────────────────────────────────────────────────────┘
```

FIG. 5

METHODS AND SYSTEMS FOR ANALYZING DATAFLOW ASSOCIATED WITH SOFTWARE CODE TO DETECT SOFTWARE ANOMALIES

FIELD

The present disclosure generally relates to software code analysis, and more specifically, to systems and methods for defining constraints and analyzing dataflow associated with software code to detect software anomalies related to cybersecurity.

BACKGROUND

Programs can use function calls to access system resources and complete objectives. In some instances, binary code that passes an argument across a function boundary associated with a function call site can be indicative of a software behavior of interest. A software behavior of interest can be indicative of, for example, a software anomaly, malware, and/or a cybersecurity issue. The binary code, however, can be difficult to interpret if the source code is unavailable or without executing the binary code. Thus, a need exists for methods and systems for describing argument constraints that are indicative of software behaviors of interest and for performing static analysis on binary code to evaluate those constraints.

SUMMARY

In an embodiment, a non-transitory processor-readable medium stores code representing instructions to be executed by one or more processors, and the instructions include code to cause the one or more processors to (1) receive executable binary code and a specification that defines a constraint and (2) generate a predicate set based on the executable binary code. The code also causes the one or more processors to identify an argument of a function to be called by the executable binary code, the argument identified based on a map associated with the function. The code also causes the one or more processors to generate a constrained predicate set based on the predicate set and the machine-readable specification and determine, using solver software, that the argument satisfies the constraint based on the constrained predicate set. Additionally, the code causes the one or more processors to generate a signal that indicates that the executable binary code is associated with a predetermined software action in response to determining the argument satisfies the constraint.

In an embodiment, a method includes receiving, at a processor, machine-readable binary code to be executed at an execution processor and generating, via the processor, a machine-readable predicate set based on the machine-readable binary code. The method also includes receiving, at the processor, a machine-readable specification indicating a dataflow constraint associated with a variable included in the machine-readable predicate set. Based on a map, a memory location associated with the variable is identified via the processor, and the dataflow constraint is bound via the processor to the memory location. The method also includes generating, via the processor, a machine-readable constrained predicate set based on the machine-readable predicate set and the dataflow constraint bound to the memory location. Using solver software, the machine-readable constrained predicate set is evaluated via the processor to generate a determination that the machine-readable binary code satisfies the dataflow constraint for at least one possible execution of the machine-readable binary code. Additionally, the method includes sending, via the processor and based on the determination, a signal that indicates that the machine-readable binary code satisfies the dataflow constraint for the at least one possible execution of the machine-readable binary code.

BRIEF DESCRIPTION OF THE DRAWINGS

FIG. 5 is a flow diagram showing a method for identifying executable binary code associated with a predetermined software action based on an argument included in the executable binary code and that satisfies a constraint, according to an embodiment.

DETAILED DESCRIPTION

Figure 1:
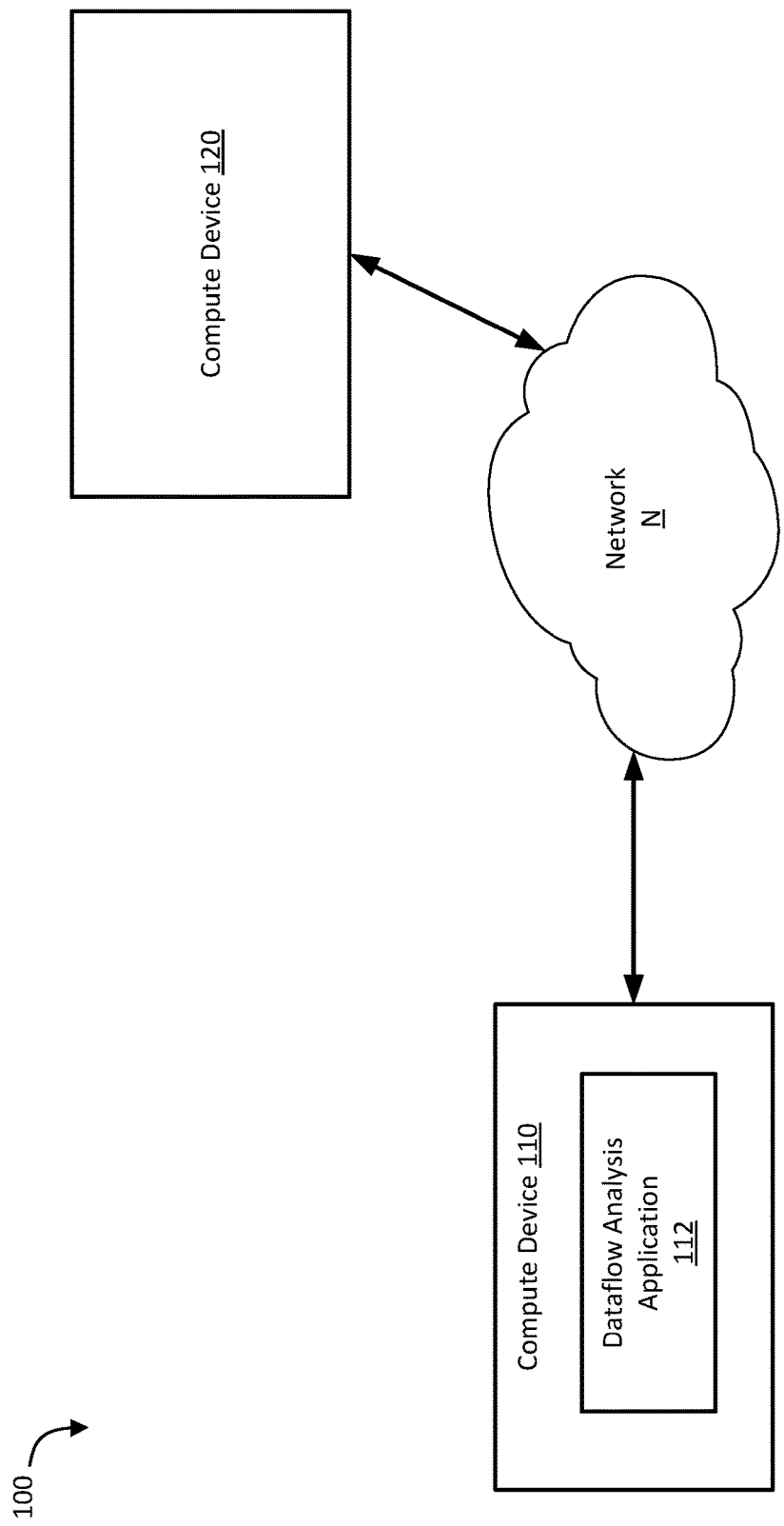
FIG. 1 is a schematic representation of a dataflow analysis system for evaluating binary code based on dataflow constraints, according to an embodiment.

A program executed at a compute device can affect (e.g., use, harm, etc.) systems and resources that are internal and/or external to the compute device. These systems can include, for example, a display, network, memory, other compute devices, and/or the like. Specifically, the program can include atoms (e.g., segments and/or lines) of code that are configured to access system resources to complete an objective. These atoms can be associated with, for example, function calls configured to access privileged (e.g., restricted and/or permission-gated) operating system (e.g., kernel) code that can access and/or use hardware resources (e.g., a display, network, memory, and/or the like). These atoms can include, for example, system call sites and/or other specialized instructions. In user-privileged code, for example, system calls can include dynamically loaded system library calls, which can generate soft interrupts to access an operating system (OS). In OS and/or driver code, for example, system calls can include direct call instructions and/or privileged hardware instructions. Given that atoms (e.g., system call sites) can cause a program to use and/or impact external resources (e.g., via a system call), some arguments (e.g., function inputs and/or values accepted by functions) passed to these atoms can indicate a predetermined software action associated with, for example, undesirable software, malicious software (e.g., malware), poorly performing software, vulnerable software, and/or the like. For example, a program configured, based on an argument(s) passed to a system call site(s), to perform a set of one or more predetermined software actions can cause the program to have an undesired software behavior (e.g., a collective effect during a time period and/or a series of instructions).

Malicious software or malicious processes, otherwise referred to as malware, can be intrusive and/or unauthorized software designed to damage, destroy, or cause harm to computers, computer systems, users, or other entities or devices. Malware can be implemented, distributed, and/or stored via artifacts including computer files ("computer file(s)" or "file(s)") such as text or document files (collectively, "document file(s)") of various filetypes. Such files can be distributed or communicated via network (e.g., Internet) communications. For example, document files can include embedded, executable scripts or macros that, in some cases, can be configured to cause malicious activity on a host device (e.g., a computer) or in a host environment (e.g., of a computer, virtual machine, etc.). Malware can also be associated with a variety of other artifacts including uniform resource locators (URLs), Internet Protocol (IP) addresses, computer processes, registry entries, and/or the like, which may be used, generated, or modified to mediate malware distribution and/or execution. Examples of common malware include viruses, worms, Trojan horse viruses, spyware, adware, and ransomware. In some instances, software can have harmful and/or unintended consequences without the creator of that software having malicious intent and/or motives. For example, software can exhibit harmful and/or unintended behaviors as a result of human error or an oversight on the part of the creator.

Some embodiments disclosed herein include systems and methods configured to implement dataflow analysis to identify predetermined software actions caused by binary data files. The systems and methods can be used, for example, to detect and/or cause prevention of unauthorized use of operating system functions and/or shared library functions. The disclosed systems and methods that implement the dataflow analysis can be configured to, for example, detect a predetermined software action (e.g., an action associated with malware) associated with binary code without executing and/or referencing the binary code. As described herein (e.g., in relation to FIG. 4), the disclosed systems and methods that implement the dataflow analysis can be configured to detect a predetermined software action associated with binary code based on a user-defined, machine-readable specification specifying at least one dataflow constraint.

FIG. 1 is a schematic diagram of a dataflow analysis system 100 for analyzing whether software code (e.g., binary code) satisfies a dataflow constraint(s), according to an embodiment. The dataflow analysis system 100 includes compute devices 110 and 120, and network N. The dataflow analysis system 100 can include alternative configurations to that shown in FIG. 1, and various steps and/or functions of the processes described below can be shared among the various devices of the dataflow analysis system 100 or can be assigned to specific devices (e.g., the compute devices 110 and 120, and/or the like).

Each of the compute devices 110 and/or 120 can include any suitable hardware-based computing devices and/or multimedia devices, such as, for example, a server, a desktop compute device, a smartphone, a tablet, a wearable device, a laptop and/or the like. In some implementations, the compute devices 110 and/or 120 can be implemented within a distributed compute framework and/or a remote computing facility. In some implementations, each of the compute devices 110 and/or 120 can be a data center or other control facility configured to run a distributed computing system and can communicate with other compute devices. In some implementations, the compute devices 110 and/or 120 can be included in a client-server configuration. As described herein, at least one of the compute devices 110 and/or 120 can be used for running an application (e.g., via an execution processor) and/or otherwise implementing steps in a method (e.g., a dataflow analysis method, as described herein).

In some implementations, the dataflow analysis system 100 can include a distributed computing system implemented by three or more compute devices (e.g., one or more compute devices in addition to the compute devices 110 and 120 shown in FIG. 1). In some examples, each compute device from a plurality of compute devices can include one or more of processors, respectively, and one or more memories. As described below, the processors can function similar to the processor 220 in FIG. 2, and/or the memories can function similar to memory 210 in FIG. 2 (discussed below).

The compute device 110 can be configured to execute (e.g., via an analysis processor) a dataflow analysis application 112. The dataflow analysis application 112 can include instructions which, when executed by the processor (e.g., the processor 220 of FIG. 2, as described herein), cause the compute device 110 to perform various steps and/or functions (e.g., implementing an argument search, a function call lookup operation, etc.), as described herein. The dataflow analysis application 112 can further include instructions for generating a user interface (e.g., graphical user interface (GUI)) that is configured to collect information from a user (e.g., configuration settings that specify an operating system type, linker strategy, loader strategy, argument constraints of interest, etc.) and/or display evaluation results and/or program slices, as described herein.

In some implementations, the compute device 120 can be associated with, for example, a user, organization, etc., that intends/desires to execute (e.g., via an execution processor included in the compute device 120) code to be analyzed using the dataflow analysis application 112. For example, software code can be analyzed via the processor of the compute device 110 to determine if the software code is associated with a predetermined software action (e.g., a software behavior associated with malware). If, for example, the compute device 110 determines that the software code is not associated with the software behavior of interest, the compute device 110 can be configured to cause transmission (e.g., via the network N) of the software code to the compute device 120, such that the compute device 120 can execute the software code via the execution processor. In some implementations, the compute device 110 can be configured to automatically (e.g., without human intervention) modify the software code in response to determining that the software code is associated with the predetermined software action. For example, the software code can be modified such that its execution excludes dataflow that satisfies a dataflow constraint. Similarly stated, the software code can be modified such that its execution excludes the predetermined software action. In response to modifying the software code, the compute device 110 can be configured to cause transmission of the modified software code to the compute device 120, such that the compute device 120 can execute the modified software code via the execution processor.

Binary code at the compute device 120 can be accessed and/or analyzed by the compute device 110 in at least one arrangement. For example, as shown in FIG. 1, the compute device 120 can send the binary code to the compute device 110 via the network N. Alternatively or in addition, in some implementations, the compute device 110 can analyze software code at the compute device 120 (e.g., via remote access). Alternatively or in addition, in some implementations, the compute device 110 can be a sandbox included on the compute device 120. In some implementations, the compute device 120 can send the software code to the compute device 110 for analysis, after which the compute device can send the software code back to the compute device 120. Alternatively or in addition, in some implementations, the compute device 110 can be associated with a network security measure such as, for example, an "air gap." For example, the compute device 110 can be physically isolated from the compute device 120, and binary code to be analyzed can be manually delivered to the compute device 110. In some instances, the compute device 110 can be configured to analyze the software code without executing the software code via the processor, which can protect the compute device 110 and/or 120 from effects of undesired software behavior.

The compute devices 110 and/or 120 can be networked via the network N directly or indirectly using wired connections and/or wireless connections. The network N can include various configurations and protocols, including short range communication protocols such as, for example, Bluetooth®, Bluetooth® LE, the Internet, World Wide Web, intranets, virtual private networks, wide area networks, local networks, private networks using communication protocols proprietary to one or more companies, Ethernet, WiFi® and HTTP, and various combinations of the foregoing. Such communication can be facilitated by any device capable of transmitting data to and from other compute devices, such as a modem(s) and/or a wireless interface(s).

Figure 2:
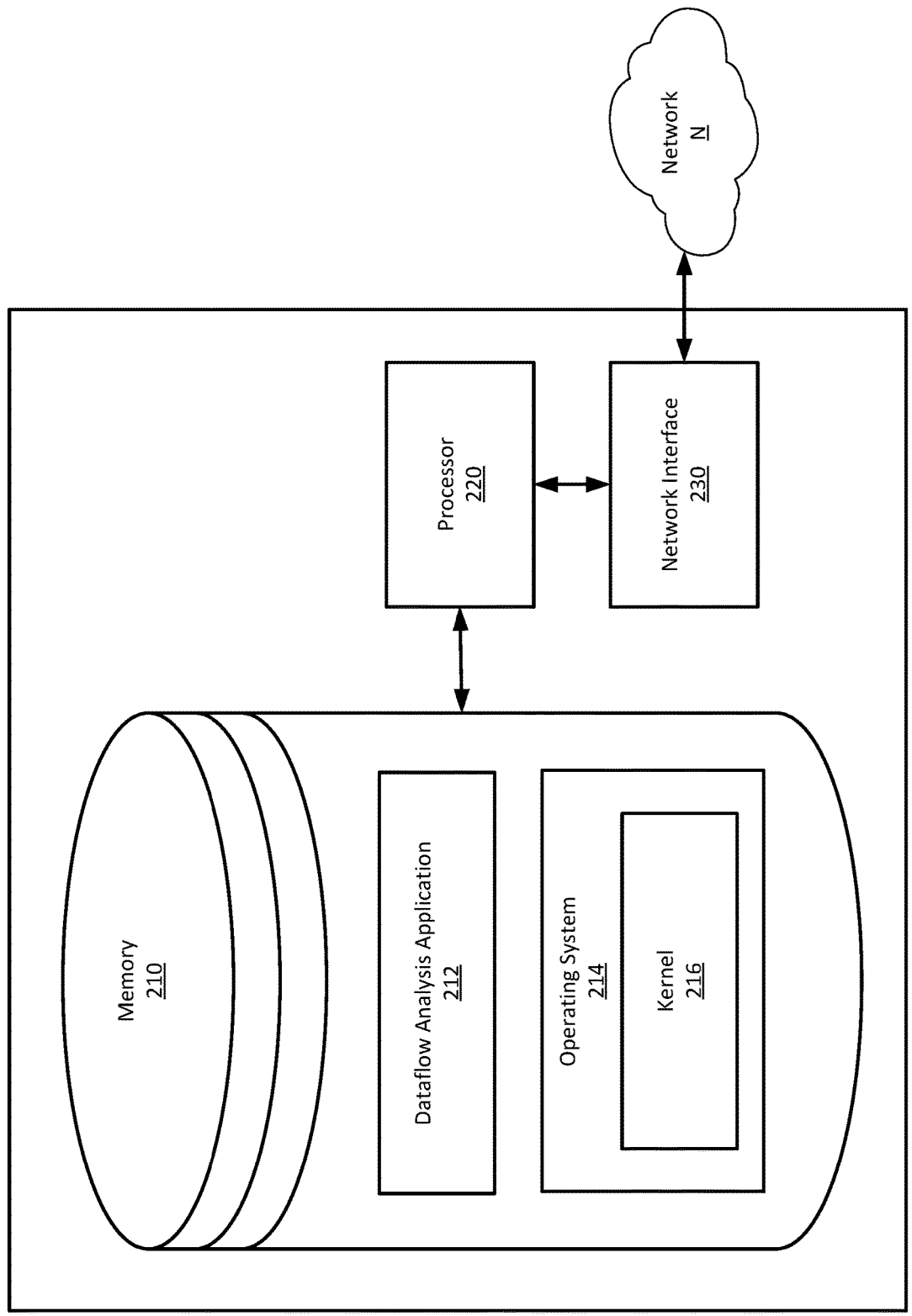
FIG. 2 is a schematic diagram of a compute device included in a dataflow analysis system, according to an embodiment.

FIG. 2 is a schematic diagram of a compute device 201 of a system, according to an embodiment. The compute device 201 can be structurally and/or functionally similar to, for example, the compute devices 110 of the dataflow analysis system 100 shown in FIG. 1. Compute device 201 can be a hardware-based computing device, a multimedia device, or a cloud-based device such as, for example, a computer device, a server, a desktop compute device, a laptop, a smartphone, a tablet, a wearable device, a remote computing infrastructure, and/or the like. Compute device 201 includes a memory 210, a processor 220, and a network interface 230.

The processor 220 can be, for example, a hardware-based integrated circuit (IC), or any other suitable processing device configured to run and/or execute a set of instructions or code (e.g., stored in memory 210). For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a remote cluster of one or more processors associated with a cloud-based computing infrastructure and/or the like. The processor 220 is operatively coupled to the memory 210 (described herein). In some embodiments, for example, the processor 220 can be coupled to the memory 210 through a system bus (for example, address bus, data bus and/or control bus).

The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like. In some implementations, the memory 210 can be a portable memory (e.g., a flash drive, a portable hard disk, and/or the like) that can be operatively coupled to the processor 220. In some instances, the memory can be remotely operatively coupled with the compute device 201, for example, via the network interface 230. For example, a remote database server (not shown) can be operatively coupled to the compute device 201.

The memory 210 can store various instructions associated with algorithms and/or data, including pattern analysis algorithms, machine learning algorithms, constraint solvers, and/or the like. The memory 210 can further include any non-transitory computer-readable storage medium for storing data and/or software that is executable by processor 220, and/or any other medium, which may be used to store information that may be accessed by processor 220 to control the operation of the compute device 201. For example, the memory 210 can store data associated with a dataflow analysis application 212. The dataflow analysis application 212 can be functionally and/or structurally similar to the dataflow analysis application 112 of FIG. 1 and/or the dataflow analysis application 312 (described herein) of FIG. 3. The memory 210 can also store data associated with an operating system 214.

Figure 3:
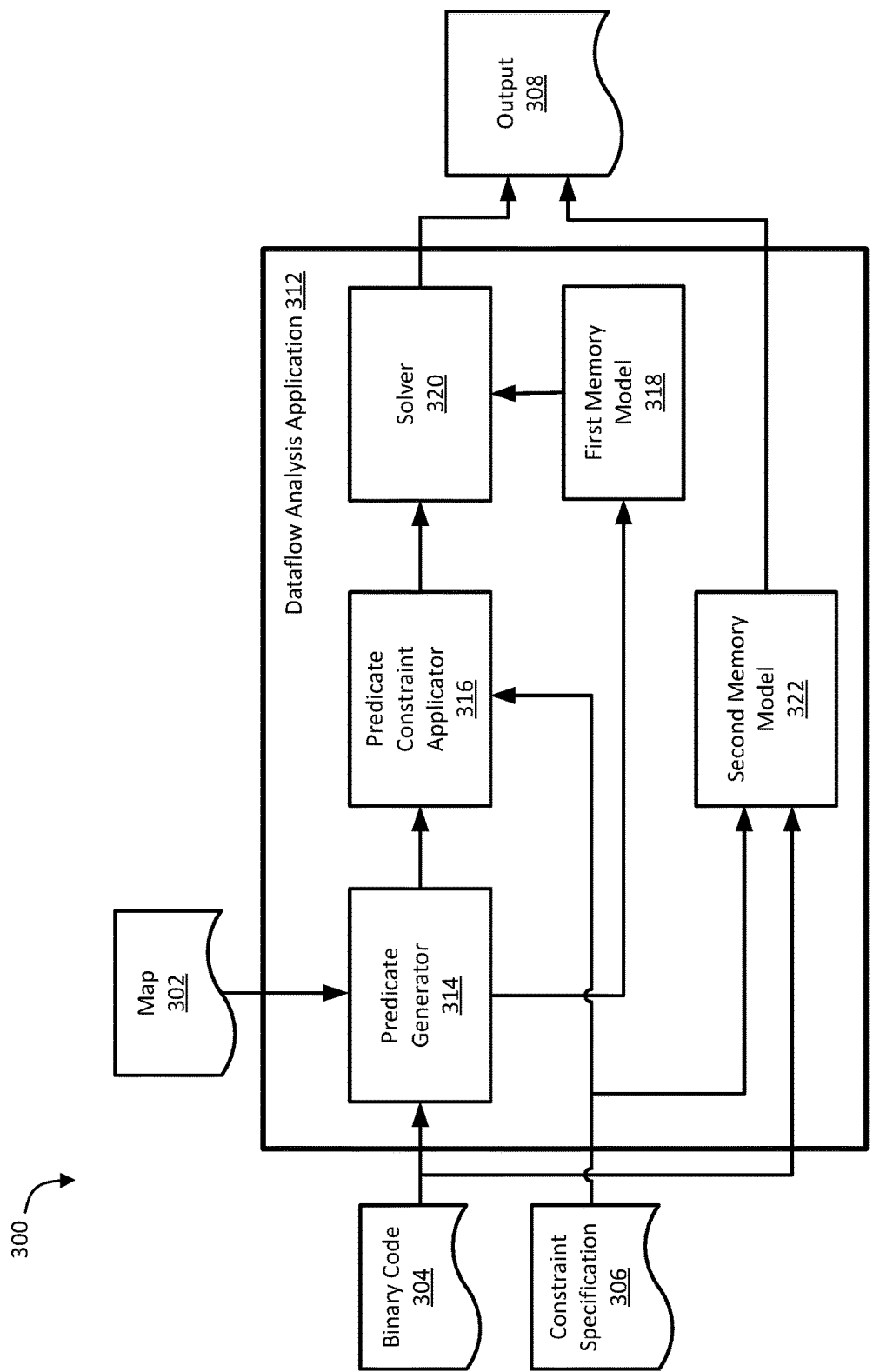
FIG. 3 is a schematic diagram of software code segments associated with a dataflow analysis system, according to an embodiment.

As described herein in relation to FIG. 3, the dataflow analysis application 212 can be configured to apply a predefined (e.g., user defined) constraint(s) to a variable(s), argument(s), and/or expression(s) within binary code and evaluate whether at least one possible execution of the binary code satisfies the predefined constraint(s). Binary code that satisfies the predefined constraint(s) can be associated with, for example, malware, an undesired and/or predetermined software action, etc.

Returning to FIG. 2, the operating system 214 can include a plurality of programs, functions and/or processes that are routine to the operations of the compute device 201. For example, the operating system 214 can provide functions such as task scheduling, file system management, memory management, caching, profiling, networking (e.g., via the network interface 230, discussed herein), hardware device drivers (e.g., via a device interface controller), and/or the like. The operating system 214 can further include and/or interact with a kernel 216 that implements a function of the operating system 214 by providing application programs (e.g., a program that includes the binary code 304 of FIG. 3, described herein) with access to resources associated with the compute device 201. The kernel 216 can be associated with multiple system calls that, for example, relate to a filesystem stored in one or more memories (e.g., memory 210 and the like). The operating system 214 can use the filesystem to store, organize, and/or manage files and folders stored on a storage device (e.g., the memory 210).

More specifically, in implementing the filesystem, the kernel 216 can be configured to process system calls (e.g., calls included in the binary code 304, described herein) related to the filesystem. These system calls can include, for example, a call to open a file, a call to close a file, a call to read a directory, a call to obtain file information, a call to create a file, a call to change the size of a file, a call to set metadata (e.g., a name, a modified status, and/or a time) associated with a file, a call to overwrite a file, a call to delete a file, a call to read metadata associated with a filesystem (e.g., metadata associated with the root of a filesystem), a call to write to a file, and/or a call to read from a file. If, for example, the system calls are associated with an undesired software behavior, the filesystem can be compromised, destroyed, copied without authorization, etc.

The network interface 230 can be configured to connect to the network N using, for example, any of the wired and wireless short range communication protocols described above. Moreover, the network N can be or include, for example, one or more of a cellular data network, a satellite network, free space optical network and/or the Internet.

In some instances, the compute device 201 can further include a display, an input device, and/or an output module (not shown in FIG. 2). The display can be, for example, any display device by which the compute device 201 can output and/or display data. The input device can include, for example, a mouse, keyboard, touch screen, voice interface, and/or any other hand-held controller or device or interface via which a user may interact with the compute device 201. The output module can include, for example, a bus, port, and/or other interfaces by which the compute device 201 may connect to and/or output data to other devices and/or peripherals.

FIG. 3 is a schematic diagram of software code segments 300 associated with a dataflow analysis system, according to an embodiment. The software code segments 300 can be associated with a compute device (e.g., a compute device that is structurally and/or functionally similar to the compute device 201 of FIG. 2 and/or the compute device 110 of FIG. 1). In some instances, for example, the software code segments 300 can be implemented in software stored in memory 210 and configured to execute via the processor 220 of FIG. 2. In some instances, for example, at least a portion of the software code segments 300 can be implemented in hardware. The software code segments 300 can include a map 302, binary code 304, a constraint specification 306, a dataflow analysis application 312, and an output 308.

The binary code 304 can be associated with a file (e.g., an executable file, application, and/or the like) to be executed at a target processor (e.g., a processor associated with the compute device 120 of FIG. 1). In some implementations, the binary code can encode data (e.g., character strings) as bit strings. The binary code 304 can represent machine-executable instructions, data, and/or the like, using a symbolic system. For example, the symbolic system can include a two-symbol system associated with a binary number system. In some instances, the binary code 304 can be interpreted using other number systems, such as a hexadecimal number system. In some instances, the binary code 304 can be generated (e.g., using a compiler) from source code associated with a human-readable programming language.

The binary code 304 can include one or more function call sites (e.g., a line(s) of code where a function is called). In some instances, the one or more function call sites can include a call(s) to one or more libraries and can include, for example, a system call(s) and/or a privileged non-system call(s), as described herein. For example, the binary code 304 can include user-privileged code that uses external calls to dynamically linked system libraries (e.g., DLLs). In some instances, the function call(s) can include an indirect function call(s), where a memory address(es) associated with the function to be called is not included in the binary code 304. An indirect function call can be associated with, for example, a pointer (e.g., a reference) to an address of a function, where the address is not determined until runtime (rather than, for example, being determined at a compile time (1) before the runtime and (2) contemporaneous to the generation of the binary code 304).

To further illustrate, rather than pointing directly to an address of an instruction/function to be executed, an indirect function call can include a pointer to a register and/or memory location (e.g., as determined by a linker during a compile time that results in the binary code 304) that can be loaded (e.g., via a loader) with an address of the function/instruction to be executed as a result of the function call. Said differently, an indirect function call site can include code that specifies an indirect jump (e.g., a location in memory/address that an address to the associated function is stored). In some instances, the linker can generate and/or configure a jump table (e.g., an array of pointers) that can store pointers to jump to target addresses of functions. The linker can also modify the one or more function call sites included in the binary code 304 to include the pointers included in the jump table. At runtime (e.g., when the binary code 304 is to be executed), the loader can be configured to dynamically populate address values for the pointers in the jump table, where each address value is associated with a function to be called/invoked from a function call site. In some instances, a linker strategy can be known and/or predefined, such that the dataflow analysis application 312 can interpret, without executing the binary code 304, an associated jump table provided as input to the dataflow analysis application 312.

The constraint specification 306 can include code associated with a domain-specific programming language (as described in relation to, for example, FIG. 4) and can be defined by a user to describe/specify a dataflow constraint. For example, the user can define a constraint on an argument to identify (e.g., based on the constraint being satisfied or violated) arguments and/or system call sites associated with a predetermined software action of interest. The dataflow analysis application 312 can use the constraint specification 306 as input to determine whether execution of the binary code 304 satisfies the dataflow constraint. The constraint specification 306 can be functionally and/or structurally (e.g., as to format, syntax, semantics, and/or the like) equivalent to the constraint specification 406 of FIG. 4 described below. A dataflow constraint can be represented by, for example, an arithmetic operation, a logical operation, a bitwise operation, a metafunction (described herein), and/or the like. The dataflow constraint can be associated with an argument passed to a function via a function call site defined within the binary code 304. A function call can include, for example, a library call, a system call (e.g., a function call configured to request a service(s) from an operating system (e.g., the operating system 214 of FIG. 2)), a privileged non-system call (e.g., an instruction associated with a special permission(s), configured to have direct access to system resources, and/or configured to run in kernel mode), and/or the like.

The dataflow analysis application 312 can be functionally and/or structurally similar to the dataflow analysis application 112 of FIG. 1 and/or the dataflow analysis application 212 of FIG. 2. The dataflow analysis application 312 can include a predicate generator 314, a predicate constraint applicator 316, an first memory model 318, a solver 320, and a second memory model 322.

The map 302 can be configured to provide a mapping between a binary instruction included in the binary code 304 and a tag. The tag can include, for example, an indication of computational behavior that can provide meaning to a user. For example, the tag can include an indication (e.g., an address and/or pointer) of a function associated with the binary instruction if, for example, the binary instruction includes a function call site. The map 302 can include, for example, an import address table (e.g., a registry key) that defines a list of base dynamic link libraries (DLLs) in memory. A DLL can include, for example, a library of shared function calls. The import address table can include addresses of functions associated with the DLLs and pointers associated with the function call sites (e.g., atoms) identified in the program chunks and/or binary code 304. The dataflow analysis application 312 can use the import address table to resolve a pointer associated with an indirect function call site (e.g., an atom) in the binary code 304. In some instances, the map 302 can include a jump table (e.g., an indirect jump table), a shared library object, a relocation table, and/or the like. In some instances, the map 302 can include a software segment configured to dynamically load a dynamic link library (DLL) associated with the binary code 304 to determine a function associated with a call site (e.g., an atom) in the program chunk(s) and/or binary code 304. In some instances, the map 302 can include a datatype manager and/or knowledge base that is configured to track calling conventions associated with function calls. In some instances, the dataflow analysis application 312 can be configured to determine a function associated with a direct system call site by using a process environment block (e.g., a data structure that includes information about a process) to determine an address of a kernel DLL.

Based on the map 302, the dataflow analysis application 312 can be configured to cause a processor (e.g., the processor 220 of FIG. 2) to execute machine-readable code to retrieve one or more targets of one or more library function call sites included in the binary code 304. In some instances, the one or more targets can include one or more functions to be called, and these one or more functions can be reachable (e.g., called based on) one or more indirect jumps. The machine-readable code can include, for example, one or more indirect jump target computations configured to determine at least one memory address associated with a target (e.g., function). An indirect jump target computation can include, for example, a lookup operation within a data structure (e.g., a table) associated with the map 302 and configured to store at least one address value based on an index (e.g., a tag, pointer, etc.). Having used the map 302 to identify a library functional call site within the binary code 304, the dataflow analysis application 312 can identify variables within the binary code 304 associated with the library function call site. For example, based on a predefined calling convention associated with the identified library function call site, the dataflow analysis application 312 can identify an argument(s) to be passed to the library function via the library function call site. Having identified the variable(s) (e.g., argument(s)), the dataflow analysis application 312 can use the predicate generator 314 to generate a predicate set, converting any mutable variables into immutable variables.

The predicate generator 314 can be configured to generate a predicate set based on the binary code 304. More specifically, the predicate generator 314 can be configured to convert the instructions of the binary code 304 to code (e.g., the predicate set) having a static single-assignment (SSA) form, such that any program variables that are defined by the binary code 304 and that are mutable can be replaced with immutable variables and included in the code having the SSA form. The predicate set can also represent computational effects of the instructions in the binary code 304 as a logical predicate. A predicate can represent (e.g., mirror) the effects of a code segment that returns a true or false value. For example, an instruction included in the binary code 304 can assign the variable x a value of three. In the predicate set, predicate associated with the instruction can represent the effects of this assignment. By default (e.g., before any constraints are applied, as described herein), values can be assigned to the representation of variables in the program within the predicate at each computational step in the program that cause the predicate to be satisfiable, i.e., evaluate to a value of true. As described below, if a constraint (as specified in the constraint specification 306) is applied to the variable x, the predicate can return a value of false if the variable assignment specified by the instruction violates the constraint or, alternatively, continue to return a value of true if the variable assignment does not violate the constraint. For example, if the constraint specifies that the variable x cannot be greater than two, the instruction assigning the value of three to the variable x would violate the constraint. As a result of the constraint violation, the predicate associated with the instruction and included in the predicate set would evaluate to a value of false. The net effect of the predicate generator 314 is that the predicate it generates can be used to determine whether any inputs and/or environmental conditions under which executing the program would satisfy the constraints placed upon the data flowing within the program.

An immutable variable can include a variable that is assigned a value once and is defined before it is used (e.g., within an operation, function, instruction, etc.). In some instances, a mutable variable can be replaced with two or more immutable variables, and each of the two or more immutable variables can have unique names. An immutable variable can be evaluated against a constraint at a given point of execution without needing to be revisited at a later point of execution. Thus, unlike a mutable variable that can have different value assignments at different execution points of the binary code 304, an immutable variable can be evaluated without tracking mutations, which can improve memory, bandwidth, and/or processor usage.

To generate immutable variables within a predicate set, the predicate generator 314 can be configured to assign an index at any point within the binary code 304 where a mutable variable is mutated (e.g., reassigned a value). The index can be carried through to any subsequent uses of the mutable variable until the mutable variable is mutated again, at which point a new index can be assigned. As a result of the indices, a mutation (from a plurality of mutations, each associated with a unique index) of the mutable variable can be assigned to a unique immutable variable within the predicate set, such that the predicate set can maintain (e.g., emulate) the functionality of the binary code 304 while excluding mutable variables.

For the purpose of illustration, the binary code 304 can cause, for example, a first value to be assigned to a variable (e.g., a memory location) in a first instruction. In a second instruction subsequent to the first instruction, the binary code 304 can cause a second value to be assigned to the variable, replacing the first value. Thus, the variable as defined in the binary code 304 is mutable. The predicate generator 314 can be configured to generate a predicate set that includes an additional variable to which the second value can be assigned, excluding the variable from reassignment following its assignment of the first value. The predicate set can use the additional variable in subsequent instructions and, as a result, can maintain a functionality of the binary code 304 without reassigning the variable.

In some instances, the binary code 304 can define a loop including a loop body having at least one instruction. The instructions of the loop body can be called during multiple execution iterations of the loop, and in some instances, the instructions can include a variable(s) that changes assignment (e.g., is mutated) in one execution iteration as compared to another (e.g., subsequent or prior) execution iteration. For example, a variable can evolve (e.g., iterate) after each successive execution iteration of the loop. In some instances, the instructions of the loop body can be constrained differently by the predicate constraint applicator 316 (described herein) between a first execution iteration and a second execution iteration. As a result, the predicate generator 314 can be configured to "unroll" the loop by duplicating (e.g., copying) at least a portion of the loop body, converting any mutable variables into immutable variables within the respective portions, and/or assigning the duplicate portions to different memory locations so that the loop body portions can be independently constrained. In doing so, the predicate generator 314 can be configured to generate a plurality of loop invariants from a loop having mutable variables.

Given the generated predicate set, the dataflow analysis application 312 can be configured to use the predicate set as input to the predicate constraint applicator 316 to identify binding locations for the constraints defined in the constraint specification 306. The predicate constraint applicator 316 can be configured to bind a constraint defined within the constraint specification 306 to a memory location associated with a variable included within the binary code 304 and represented as an immutable variable within the generated predicate set. Specifically, the predicate constraint applicator 316 can be configured, for example, map variables within a program to constraints. For example, for the program P having variables $x\_1, x\_2, y\_1, y\_2, \ldots y\_7, z\_1, \ldots$ and for constraints C1 (e.g., to be applied to $x\_2$ and $y\_7$) and C2, the predicate constraint applicator 316 can be configured to define an expression $P (x\_1, x\_2, y\_1, y\_2 \ldots, z\_1, \ldots) \wedge C1 (x\_2, y\_7) \wedge C2 (\ldots)$ that can be evaluated using a memory model that represents addressable memory, as described below. As described above, the memory location (e.g., the memory location of an argument to be constrained) can be identified based on the map 302. If multiple immutable variables were generated based on a mutable variable included in the binary code 304, the memory location can be identified based on the specific immutable variable to be constrained and as defined by the predicate set, such that the constraint can be evaluated at any point within the binary code 304 that a mutable variable is called. As a result of binding the defined constraints to the memory locations, the predicate constraint applicator 316 can generate a constrained predicate set. The constrained predicate set can include a logical constraint (as defined by the constraint specification 306) associated with (e.g., bound to) a variable as an assertion, the logical constraint attached to an appropriate location in the program (e.g., at a specific mutation of the variable as represented in the binary code 304).

In some instances, the binary code 304 can include an instruction that implements a pointer dereferencing operation. A pointer dereferencing operation can be configured to determine an object and/or value pointed to by a pointer (e.g., a reference to a memory location). A dereferencing operation can produce a result that can, in some instances, be undefined at the time of static analysis and/or at the time of generating the predicate set. To account for pointer dereferencing operations, the dataflow analysis application 312 can be configured to build (e.g., generate, parameterize, etc.) the first memory model 318 using the logic of any uninterpreted predicates associated with any pointer dereferencing operations. The first memory model 318 can include a memory model that can store and track a possible value(s) that a memory read operation implemented by the binary code 304 can return. For example, a first instruction, included in the binary code 304 and represented by a first predicate in the predicate set, can be configured to cause a value to be written to a memory location. The dataflow analysis application 312 can be configured to automatically cause an update to the first memory model 318 in response to determining that the first instruction causes a value to be written to the memory location. For example, the value can be stored within the first memory model 318 at an index associated with memory location. The first memory model 318 can then return the value based on a query that indicates the memory location. For example, a second instruction that is included in the binary code 304 and that is to be executed subsequent to the first instruction can cause the value (previously written as a result of the first instruction) to be read from the memory location. During static analysis (e.g., without executing the first instruction and the second instruction), the dataflow analysis application 312 can be configured to query, based on the memory location, the first memory model 318 to retrieve the value and interpret the second instruction.

Using the first memory model 318, symbolic addresses and/or symbolic variables, having concrete values that can be unknown at static analysis time, can be tracked, constrained, and/or evaluated. In some implementations, the dataflow analysis application 312 can be configured to place additional assertions within the predicate set and/or the constrained predicate set. The additional assertions can link the first memory model 318 to any uninterpreted predicates, such that constraints can applied when sufficient information is available to determine the result of the pointer dereferencing operation (e.g., during constraint evaluation process performed by the solver 320, described herein). For the purpose of illustration, the example instruction "mov $0x10 (% eax), (% esp)" might be represented using the uninterpreted predicate "mem (esp_i)=mem (0x10+eax_i), where mem is an uninterpreted predicate (e.g., a black box function whose internal details are not known and/or expressed). This uninterpreted predicate could then be simplified following concretization. In some instances, the first memory model 318 can be built to track constraints that are implied by logic variables. To illustrate such a first memory model 318, given an example 5-element memory space, example instructions can include "mov 0x3, % eax" and "mov 0x7, (% eax)." The predicate generator 314 can convert these instructions into a logical predicate using an uninterpreted predicate "mem" as a memory model. The memory model can be represented as "eax=0x3/mem (eax)=0x7," which after constant propagation, can become "eax=0x3/mem (0x3)=0x7." Alternatively, memory can be represented as an array (e.g., {mem1, mem2, mem3, mem4, mem5}, such that the example instructions can be converted to the predicate "{mem1, mem2, mem3, mem4, mem5} [0x3]=0x7," and after simplification, "eax=0x3/mem3=0x7."

Given (1) the constrained predicate set representing the defined constraints as applied to variables of the binary code 304 and (2) the first memory model 318 tracking any unresolved variables associated with, for example, a pointer dereferencing operation, the solver 320 can be configured to determine whether the variables can have at least one set of concrete values (e.g., the binary code 304 can have at least one possible execution) that can satisfy the constraints. The solver 320 can include solver software that implements, for example, a satisfiability modulo theory (SMT) solver. Specific implementations of the solver 320 can include, for example, a Z3 Theorem Prover and/or the like.

In some instances, a constraint can be evaluated without using the solver 320. For example, a variable associated with the constraint can have a known value and/or a known address at the time of static analysis (e.g., at a time contemporaneous to the generating of the predicate set and/or the constrained predicate set). An example of such a constraint can include, for example, a variable having a string datatype. The second memory model 322 can be configured to evaluate whether the variable having the known value and/or known address satisfies the constraint(s) defined within the constraint specification. Given that the variable is known (e.g., fixed and/or concrete), the evaluation of the constraint as applied to such a variable can be simpler as comparted to evaluating a constraint as applied to a variable that can have a range of variables; as a result, the second memory model 322 can evaluate a known variable without using the solver 320, which can improve usage of memory, bandwidth, and/or processing resources.

As a result of using the solver 320 to determine that the binary code 304 includes a variable that satisfies a constraint(s) defined by the constraint specification 306, the dataflow analysis application 312 can be configured to automatically cause generation of the output 308. The output 308 can include, for example, a signal that indicates that the binary code 304 is associated with a predetermined software action (e.g., an undesired software action associated with malware). The output 308 can also include at least one set of at least one concrete (e.g., fixed) value that can be assigned to a constrained variable(s) to satisfy the defined constraint(s) and during at least one possible execution of the binary code 304. In some implementations, the output 308 can also include a program slice that includes the constrained variable(s) that are determined to satisfy the defined constraint(s). In some implementations, the dataflow analysis application 312 can be configured to automatically (e.g., without human intervention) cause the binary code 304 to be modified, such that the resulting modified binary code excludes any variable and/or expression that satisfies a defined constraint. As a result, the modified binary code can be prevented from implementing the predetermined software action.

Figure 4:
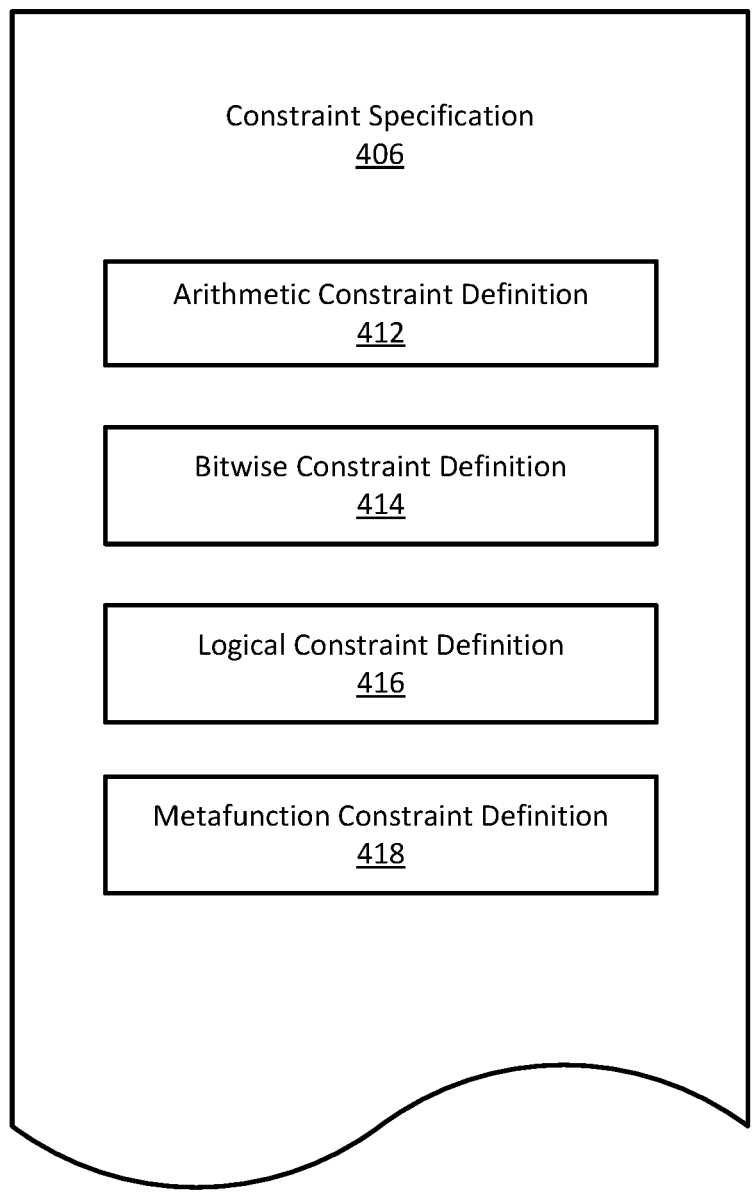
FIG. 4 is a schematic diagram of a behavioral specification defining at least one dataflow constraint and used by a dataflow analysis system to analyze dataflow in binary code, according to an embodiment.

FIG. 4 is a schematic diagram of a constraint specification 406 used by a dataflow analysis system (e.g., the dataflow analysis system 100 of FIG. 1) to apply and evaluate constraints to binary code, according to some embodiments. The constraint specification 406 can be functionally and/or structurally (e.g., as to format) equivalent to the constraint specification 306 of FIG. 3. The constraint specification 406 can include, for example, descriptive code and/or a machine-readable specification that defines, for example, variables and/or expressions, that are to be bound as dataflow constraints to specific memory locations at specific points in the execution of a program implemented by binary code. The constraint specification 406 can define constraints on (1) arguments that can be passed across a function boundary and/or (2) any other code segment included in binary code.

For the purpose of illustration, an operating system (e.g., the operating system 214 of FIG. 2) can include a dynamic library function having a C prototype (e.g., declaration) of "void a (int, int, char*)." A constraint for the arguments of such a function can be represented as pseudocode as, for example, "a (x,y,z) invoked such that 0<x+y and strcmp ((char*) z, "/usr/bin/bash")==0." Thus, the constraint can specify that the function invocation is to be identified if, during execution, the call site in the C code (and/or as implemented in binary code associated with the C code) can be invoked as specified. In this example, the variable names x, y, and z can be distinct from and/or in a different name space from variable names in the program. As described herein, unlike variables in a program, which can be mutable, specified variables to be constrained can be treated as immutable, such that they do not take on different values at different times.

To define a constraint, the constraint specification 406 can include, for example, an arithmetic constraint definition 412, a bitwise constraint definition 414, a logical constraint definition 416, and/or a metafunction constraint definition 418. The arithmetic constraint definition 412 can define a constraint using an arithmetic operation (e.g., "2x+2y!=4z). The bitwise constraint definition 414 can define a constraint using a bitwise operation (e.g., a & b=1). The logical constraint definition 416 can define a constraint using a logical operation (e.g., A|B=0). The metafunction constraint definition 418 can include an operation that can be unassociated with (e.g., not implemented by) a standard arithmetic operation. For example, the metafunction constraint definition 418 can define a constraint using a string operation (e.g., a string concatenation), a pointer dereferencing operation, and/or similar functions.

In some implementations, the constraint specification 406 can include a behavioral specification unit (BSU) for each specified constraint. A BSU can include, for example, a documentation comment, a name, at least one BSU parameter, and/or at least one rule. A documentation comment can include, for example, descriptive text that can help a reader of the constraint specification 406 understand code/contents within. A BSU parameter can include, for example, a BSU name and/or a datatype reference annotation. The datatype reference annotation can indicate a datatype that can include, for example, a machine type (e.g., a type specified in C programming language) and/or a synthetic datatype associated with a BSU expression.

A BSU can cause a dataflow analysis application to detect a match in a submitted software sample (e.g., the binary code 304) if at least one rule included in a BSU matches at least one code segment (e.g., at least one instruction and/or at least one function call site) in the software sample. A rule included in a BSU can include, for example, a documentation comment, a rule name, at least one rule parameter, an actions section, a location section, and/or a capture section. A rule parameter can include, for example, a constraint on a value (e.g., an argument associated with a function call). In some instances, at least one rule parameter can be unassigned and/or not given a constraint. An unassigned rule parameter can be assigned a value according to the actions section of a rule. The actions section can include at least one parameter assignment based on an expression evaluation. The location section can include one or more expressions for specifying constraints on the values of rule parameters.

The capture section of a rule can be used, for example, to a populate BSU parameter(s) and/or specify a portion of binary code that is to be analyzed and/or returned. A rule parameter can refer to an input, since a value(s) from detected code can be assigned to a rule parameter(s), and a BSU parameter can refer to an output of the BSU. BSU parameters can be assigned values that are based on rules parameters. In some instances, however, a value assigned to rule parameters can be independent of BSU parameters. A BSU parameter can be assigned a value in the capture section. If a BSU parameter is not assigned a value in a rule's capture section, a compiler can flag that rule as a compile error.

The following example code block illustrates an example BSU.

```

description: Checks if a debugger is present and exits the
program if it is
parameters :
    -   name: IsDebuggerPresent
        type: BOOL
        description: Result of call to IsDebuggerPresent

BSU_START Debugger_Present ( IsDebuggerPresent : BOOL ) :
    RULE_START
        PARAMETERS: isDebuggerPresent
        PATTERN :
            ANY_ORDER: {
                CALL: isDebuggerPresent = IsDebuggerPresent ( ) ;
                if isDebuggerPresent then CALL: ExitThisProcess (_,
_);
            }
        WHERE :
            isDebuggerPresent != 0;
        CAPTURE :
            IsDebuggerPresent = isDebuggerPresent;
    RULE_END
BSU_END
```

Example code associated with a domain-specific language used to compose a BSU is shown in the example code block below. A domain-specific language (DSL) can include, for example, a programming language configured to be used in a narrowed (e.g., specific) subset of at least one application. In some instances, a domain-specific language can be distinguished from, for example, a general-purpose language that can apply broadly across a plurality of domains/applications. A domain-specific language can include custom (e.g., unique) syntax to achieve a goal and/or implementation that can be used to solve a problem associated with the domain. For example, a domain-specific language associated with a BSU and specific to, for example, a software analysis domain, can include syntax that defines a constraint, and the defined constraint can be used to solve the problem of identifying distinguished software behavior and/or predetermined software actions. In some instances, a domain-specific language can be used to express solutions in an idiom and at a level of abstraction associated with the problem domain (e.g., software/binary code analysis). For example, the example code block below includes domain-specific syntax configured to define rules, constraints (e.g., constraints associated with a metafunction), parameters, and/or the like, associated with a BSU.

```
BsuModel: (bsuDecls+=BsuDecl)*;
BsuDecl :
    (docComment=Documentation)?
    'BSU_START'
    name=ID
    '(' (params+=BsuParam (',' params+=BsuParam)*)? ')' ':'
        (rules+=BsuRule)*
    'BSU_END'
;
Documentation:
    comment=DOC_COMMENT
;
BsuParam: name=ID (':' typeRef=TypeRef)?;
TypeRef: name=ID ('*')* ;
BsuRule:
    (docComment=Documentation)?
    'RULE_START'
    ('NAME:' name=ID)?
    ('PARAMETERS:' params+=RuleParam (',' params+=RuleParam)*
    (',')? )?
    'PATTERN:' pattern=Pattern
    ('WHERE:' (guards+=Expr ';')* )?
    'RULE_END'
;
RuleParam: name=ID (':' typeRef=TypeRef)?;
Pattern :
    AnyOrderPattern |
    ExtCallPattern |
    InstructionsPattern
;
AnyOrderPattern :
    'ANY_ORDER:' '{' (patterns+=Pattern ';')+ '}'
;
ExtCallPattern :
    'CALL:' (returnVal=RuleParamRef '=')?
        funcRef=ExtFuncRef '(' (args+=Expr (',' args+=Expr)*)? ')'
;
ExtFuncRef: name=ID ;
InstructionsPattern :
    'INSTRUCTIONS:' '{' (instructions+=STRING ';')+ '}'
;
Expr:
    UnaryApplyExpr |
    InfixExpr
;
UnaryApplyExpr:
    operator=UnaryOperator arg=Expr
;
UnaryOperator :
    '*'     | // Pointer-deference operator
    '&'     | // Address-of operator
    '!'     | // Boolean negation operator
    '-'       // Numeric negation operator
;
InfixExpr:
    left=QualifiedExpr (oper=InfixOperator right=Expr)?
;
QualifiedExpr:
    qualifier=ExprPrimary (selectors+=ElementSelector)*
;
ElementSelector :
    ListElementSelector |
    FieldElementSelector
;
ListElementSelector:
    '[' index=Expr ']'
;
FieldElementSelector:
    '.' field=ID
;
ExprPrimary :
    FunctionApplyExpr   |
    RuleParamRef        |
    VarLengthArg        |
    WildcardExpr        |
    String Expr         |
    BoolExpr            |
    IntExpr             |
    HexExpr             |
    ParenExpr
;
FunctionApplyExpr:
    '@' funcRef=MetaFuncRef '(' (args+=Expr (',' args+=Expr)*)? ')'
;
MetaFuncRef: name=ID ;
VarLengthArg :
    {VarLengthArg} '...' paramRef=RuleParamRef?
;
WildcardExpr :
    {WildcardExpr} '_'
;
StringExpr :
    value=STRING
;
BoolExpr :
    isTrue ?= 'true' |
    isFalse ?= 'false'
;
```

-continued

```
IntExpr :
    value=INT
;
HexExpr :
    value=HEX
;
ParenExpr :
    '(' innerExpr=Expr ')'
;
InfixOperator:
    '&&'    | // AND boolean operator
    '||'    | // OR boolean operator
    '=='    | // EQUALS operator
    '!='    | // NOT EQUALS operator
    '>='    | // GREATER THAN OR EQUAL TO operator
    '<='    | // LESS THAN OR EQUAL TO operator
    '>'     | // GREATER THAN operator
    '<'     | // GREATER THAN operator
    '+'     | // PLUS operator
    '-'     | // SUBTRACT operator
    '*'     | // MULTIPLICATION operator
    '/'     | // DIVIDE operator
    '%'     // MODULO operator
;
terminal HEX:
    ('0x'|'0X') ('0'..'9'|'a'..'f'|'A'..'F'|'_')+
    ('#' (('b'|'B')('i'|'I') | ('l'|'L')))?;
terminal DOC_COMMENT : '###' -> '###';
```

FIG. 5 is a flow diagram showing a method 500 for identifying executable binary code associated with a predetermined software action based on an argument that is included in the executable binary code and that satisfies a constraint. The method 500 can be implemented by a dataflow analysis system described herein (e.g., the dataflow analysis system 100 of FIG. 1). Portions of the method 500 can be implemented using a processor (e.g., the processor 220 of FIG. 2) of any suitable compute device (e.g., the compute device 110 of FIG. 1 and/or the compute device 201 of FIG. 2).

At 502, the method 500 includes receiving, at a processor (e.g., the processor 220 of FIG. 2), a file that includes executable binary code and generating a predicate set based on the executable binary code. At 504, the method 500 includes identifying an argument of a function to be called by the executable binary code, the argument identified based on a map associated with the function. The method 500 at 506 includes generating a constrained predicate set based on the predicate set and the machine-readable specification. At 508, the method 500 includes determining, using solver software, that the argument satisfies the constraint based on the constrained predicate set. At 510, the method 500 includes generating a signal that indicates that the executable binary code is associated with a predetermined software action in response to determining the argument satisfies the constraint.

Figure 6:
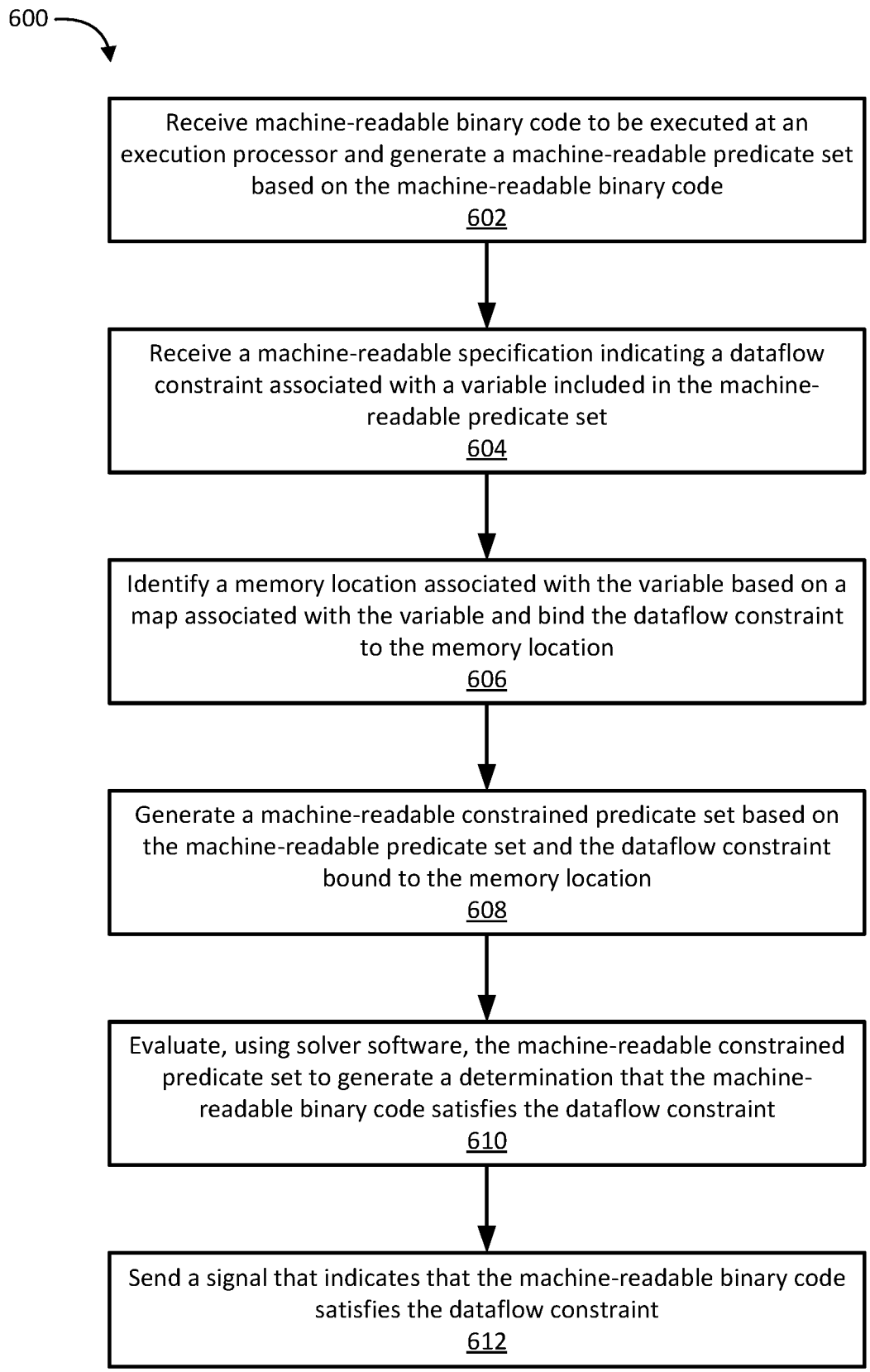
FIG. 6 is a flow diagram showing a method for determining that machine-readable binary code satisfies a dataflow constraint for at least one possible execution, according to an embodiment.

FIG. 6 is a flow diagram showing a method 600 for determining that machine-readable binary code satisfies a dataflow constraint for at least one possible execution. The method 600 can be implemented by a dataflow analysis system described herein (e.g., the dataflow analysis system 100 of FIG. 1). Portions of the method 600 can be implemented using a processor (e.g., the processor 220 of FIG. 2) of any suitable compute device (e.g., the compute device 110 of FIG. 1 and/or the compute device 201 of FIG. 2).

At 602, the method 600 includes receiving, at a processor, machine-readable binary code to be executed at an execution processor and generating, via the processor, a machine-readable predicate set based on the machine-readable binary code. The method 600 at 604 includes receiving, at the processor, a machine-readable specification indicating a dataflow constraint associated with a variable included in the machine-readable predicate set. Based on a map, at 606 of the method 600, a memory location associated with the variable is identified via the processor, and the dataflow constraint is bound via the processor to the memory location. The method 600 at 608 includes generating, via the processor, a machine-readable constrained predicate set based on the machine-readable predicate set and the dataflow constraint bound to the memory location. Using solver software, at 610 of the method 600, the machine-readable constrained predicate set is evaluated via the processor to generate a determination that the machine-readable binary code satisfies the dataflow constraint for at least one possible execution of the machine-readable binary code. The method 600 at 612 includes sending, via the processor and based on the determination, a signal that indicates that the machine-readable binary code satisfies the dataflow constraint for the at least one possible execution of the machine-readable binary code.

In an embodiment, a non-transitory processor-readable medium stores code representing instructions to be executed by one or more processors, and the instructions include code to cause the one or more processors to (1) receive executable binary code and a specification that defines a constraint and (2) generate a predicate set based on the executable binary code. The code also causes the one or more processors to identify an argument of a function to be called by the executable binary code, the argument identified based on a map associated with the function. The code also causes the one or more processors to generate a constrained predicate set based on the predicate set and the machine-readable specification and determine, using solver software, that the argument satisfies the constraint based on the constrained predicate set. Additionally, the code causes the one or more processors to generate a signal that indicates that the executable binary code is associated with a predetermined software action in response to determining the argument satisfies the constraint.

In some implementations, the executable binary code can include a function call site associated with the function, the map can indicate a target of the function call site reachable by one or more indirect jumps, and the argument can be identified based on the target. In some implementations, the machine-readable specification can be associated with a domain-specific language configured to specify at least one dataflow constraint. In some implementations, the solver software can be associated with a satisfiability modulo theory (SMT) solver. In some implementations, the executable binary code can represent the argument using a mutable variable, and the predicate set can represent the argument using an immutable variable.

In an embodiment, a method includes receiving, at a processor, machine-readable binary code to be executed at an execution processor and generating, via the processor, a machine-readable predicate set based on the machine-readable binary code. The method also includes receiving, at the processor, a machine-readable specification indicating a dataflow constraint associated with a variable included in the machine-readable predicate set. Based on a map, a memory location associated with the variable is identified via the processor, and the dataflow constraint is bound via the processor to the memory location. The method also includes generating, via the processor, a machine-readable constrained predicate set based on the machine-readable predicate set and the dataflow constraint bound to the memory location. Using solver software, the machine-readable constrained predicate set is evaluated via the processor to generate a determination that the machine-readable binary code satisfies the dataflow constraint for at least one possible execution of the machine-readable binary code. Additionally, the method includes sending, via the processor and based on the determination, a signal that indicates that the machine-readable binary code satisfies the dataflow constraint for the at least one possible execution of the machine-readable binary code.

In some implementations, the variable can be associated with an argument of a function associated with a function call site included in the machine-readable binary code, and the dataflow constraint can include an argument constraint associated with the argument. Additionally, the identifying the memory location can include executing, via the processor, machine-readable code to retrieve a target of the function call site, the target reachable by one or more indirect jumps. The identifying the memory location can also include determining, via the processor and based on the target, at least one of an argument memory location associated with the function or an argument calling convention associated with the function. In some implementations, the method can further include evaluating, via the processor and using the solver software, the machine-readable constrained predicate set to generate a determination that the machine-readable binary code satisfies the dataflow constraint for at least one possible execution of the machine-readable binary code. Additionally, the method can further include sending, via the processor, a signal that indicates that the machine-readable binary code satisfies the dataflow constraint for at least one possible execution of the machine-readable binary code.

In some implementations, the solver software can be associated with a satisfiability modulo theory (SMT) solver. In some implementations, the machine-readable predicate set can have a single static-assignment (SSA) form. In some implementations, the dataflow constraint can be represented by at least one of an arithmetic operation, a logical operation, a bitwise operation, or a metafunction. In some implementations, the metafunction can include at least one of a string operation or a pointer dereferencing operation. In some implementations, the machine-readable specification can be associated with a domain-specific language configured to specify at least one dataflow constraint. In some implementations, the signal can include an indication of one or more slices of the machine-readable binary code. In some implementations, the signal can include an indication of at least one set of concrete values associated with the at least one possible execution. In some implementations, the machine-readable binary code can define a loop having a loop body, and the dataflow constraint can cause the loop body to have (1) a first constraint during a first execution iteration of the loop and (2) a second constraint during a first execution iteration of the loop. Additionally, the memory location can include a first memory location and a second memory location, and the generating the machine-readable constrained predicate set can include duplicating, via the processor, at least a portion of the loop body to produce (a) a first portion of the loop body associated with the first memory location and (b) a second portion of the loop body associated with the second memory location. The generating the machine-readable constrained predicate set can also include binding, via the processor, the first constraint to the first memory location and the second constraint to the second memory location. The generating the machine-readable constrained predicate set can also include generating, via the processor, the machine-readable constrained predicate set based on the machine-readable predicate set, the first constraint bound to the first memory location, and the second constraint bound to the second memory location.

In some implementations, the variable can be a first variable, the dataflow constraint can be a first dataflow constraint, and the memory location can be a first memory location. Additionally, the method can further include identifying, via the processor, a dereferencing operation included in the machine-readable binary code, the dereferencing operation associated with a second variable (1) having, at a time of static analysis, at least one of an undefined value or an undefined address, and (2) associated with a second dataflow constraint indicated by the machine-readable specification. The method can also include generating, via the processor, a memory model based on the dereferencing operation, and evaluating, via the processor and using the solver software, the machine-readable constrained predicate set based on the memory model and the second dataflow constraint.

In some implementations, the generating the memory model can be based further on at least one uninterpreted predicate included in the machine-readable constrained predicate set and associated with the second variable. In some implementations, the variable can be a first variable, the dataflow constraint can be a first dataflow constraint, and the memory location can be a first memory location. Additionally, the method can further include generating a memory model based on a second dataflow constraint indicated by the machine-readable specification and associated with a second variable indicated in the machine-readable binary code and having, at a time of static analysis, a defined address and a defined value. The method can also include evaluating the second dataflow constraint for the second variable based on the memory model and without using the solver software. In some implementations, the second variable can have a string datatype. In some implementations, the method can further include not referencing a source code associated with the machine-readable binary code. In some implementations, the method can further include not executing the machine-readable binary code. In some implementations, the method can further include modifying, based on the signal, an instruction included in the machine-readable binary code and associated with the dataflow constraint.

All combinations of the foregoing concepts and additional concepts discussed here within (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A non-transitory processor-readable medium storing code representing instructions to be executed by one or more processors, the instructions comprising code to cause the one or more processors to:
   receive a file that includes executable binary code;
   receive a machine-readable specification that defines a constraint;
   generate a predicate set based on the executable binary code;

identify an argument of a function to be called by the executable binary code, the argument identified based on a map associated with the function;

generate a constrained predicate set based on the predicate set and the machine-readable specification;

determine, using solver software, that the argument satisfies the constraint based on the constrained predicate set; and generate a signal (1) that indicates that the executable binary code is associated with a predetermined software action in response to determining the argument satisfies the constraint and (2) to prevent the executable binary code from being executed at a target processor that is different from the one or more processors.

2. The non-transitory processor-readable medium of claim 1, wherein:
the executable binary code includes a function call site associated with the function;
the map indicates a target of the function call site reachable by one or more indirect jumps; and
the argument is identified based on the target.

3. The non-transitory processor-readable medium of claim 1, wherein
the machine-readable specification is associated with a domain-specific language that specifies at least one dataflow constraint.

4. The non-transitory processor-readable medium of claim 1, wherein the solver software implements a satisfiability modulo theory (SMT) solver.

5. The non-transitory processor-readable medium of claim 1, wherein:
the executable binary code represents the argument using a mutable variable; and
the predicate set represents the argument using an immutable variable.

6. A method, comprising:
receiving, at a processor, machine-readable binary code to be executed at an execution processor;
generating, via the processor, a machine-readable predicate set based on the machine-readable binary code;
receiving, at the processor, a machine-readable specification indicating a dataflow constraint associated with a variable included in the machine-readable predicate set;
identifying, via the processor, a memory location associated with the variable based on a map associated with the variable;
binding, via the processor, the dataflow constraint to the memory location;
generating, via the processor, a machine-readable constrained predicate set based on the machine-readable predicate set and the dataflow constraint bound to the memory location;
evaluating, via the processor and using solver software, the machine-readable constrained predicate set to determine that the machine-readable binary code satisfies the dataflow constraint for at least one possible execution of the machine-readable binary code; and
in response to determining that the machine-readable binary code satisfies the dataflow constraint for the at least one possible execution of the machine-readable binary code, modifying, via the processor, an instruction that is included in the machine-readable binary code and is associated with the dataflow constraint, to discontinue the machine-readable binary code from satisfying the dataflow constraint for the at least one possible execution of the machine-readable binary code.

7. The method of claim 6, wherein:
the variable is associated with an argument of a function associated with a function call site included in the machine-readable binary code;
the dataflow constraint includes an argument constraint associated with the argument; and
the identifying the memory location includes:
executing, via the processor, machine-readable code to retrieve a target of the function call site, the target reachable by one or more indirect jumps, and
determining, via the processor and based on the target, at least one of an argument memory location associated with the function or an argument calling convention associated with the function.

8. The method of claim 6, further comprising:
in response to determining that the machine-readable binary code satisfies the dataflow constraint for the at least one possible execution of the machine-readable binary code, sending, via the processor, a signal that indicates that the machine-readable binary code satisfies the dataflow constraint for at least one possible execution of the machine-readable binary code.

9. The method of claim 8, wherein the signal includes an indication of one or more slices of the machine-readable binary code.

10. The method of claim 8, wherein the signal includes an indication of at least one set of concrete values associated with the at least one possible execution.

11. The method of claim 6, wherein the solver software is associated with a satisfiability modulo theory (SMT) solver.

12. The method of claim 6, wherein the machine-readable predicate set has a single static assignment (SSA) form.

13. The method of claim 6, wherein the dataflow constraint is represented by at least one of an arithmetic operation, a logical operation, a bitwise operation, or a metafunction.

14. The method of claim 13, wherein the metafunction includes at least one of a string operation or a pointer dereferencing operation.

15. The method of claim 6, wherein the machine-readable specification is associated with a domain-specific language that specifies at least one dataflow constraint.

16. The method of claim 6, wherein:
the machine-readable binary code defines a loop having a loop body;
the dataflow constraint causes the loop body to have (1) a first constraint during a first execution iteration of the loop and (2) a second constraint during a first execution iteration of the loop;
the memory location includes a first memory location and a second memory location; and
the generating the machine-readable constrained predicate set includes:
duplicating, via the processor, at least a portion of the loop body to produce (a) a first portion of the loop body associated with the first memory location and (b) a second portion of the loop body associated with the second memory location,
binding, via the processor, the first constraint to the first memory location and the second constraint to the second memory location, and
generating, via the processor, the machine-readable constrained predicate set based on the machine-readable predicate set, the first constraint bound to the first memory location, and the second constraint bound to the second memory location.

17. The method of claim 6, wherein the variable is a first variable, the dataflow constraint is a first dataflow constraint, and the memory location is a first memory location, the method further comprising:
- identifying, via the processor, a dereferencing operation included in the machine-readable binary code, the dereferencing operation associated with a second variable (1) having, at a time of static analysis, at least one of an undefined value or an undefined address, and (2) associated with a second dataflow constraint indicated by the machine-readable specification;
- generating, via the processor, a memory model based on the dereferencing operation; and
- evaluating, via the processor and using the solver software, the machine-readable constrained predicate set based on the memory model and the second dataflow constraint.

18. The method of claim 17, wherein the generating the memory model is based further on at least one uninterpreted predicate included in the machine-readable constrained predicate set and associated with the second variable.

19. The method of claim 6, wherein the variable is a first variable, the dataflow constraint is a first dataflow constraint, and the memory location is a first memory location, the method further comprising:
- generating a memory model based on a second dataflow constraint indicated by the machine-readable specification and associated with a second variable indicated in the machine-readable binary code and having, at a time of static analysis, a defined address and a defined value; and
- evaluating the second dataflow constraint for the second variable based on the memory model and without using the solver software.

20. The method of claim 19, wherein the second variable has a string datatype.

21. The method of claim 6, further comprising:
- not referencing a source code associated with the machine-readable binary code.

22. The method of claim 6, further comprising:
- not executing the machine-readable binary code.

\* \* \* \* \*